Feb. 17, 1970  E. H. ISAACKS  3,495,688
SHOPPING CART WHEEL LOCK
Filed Oct. 16, 1968

INVENTOR
ELMER H. ISAACKS

BY *Gullen, Sloman, & Cantor*

ATTORNEYS

United States Patent Office 3,495,688
Patented Feb. 17, 1970

3,495,688
SHOPPING CART WHEEL LOCK
Elmer H. Isaacks, 13950 Westbrook,
Detroit, Mich. 48223
Filed Oct. 16, 1968, Ser. No. 768,068
Int. Cl. B60t 1/00
U.S. Cl. 188—31                                        1 Claim

ABSTRACT OF THE DISCLOSURE

A magnetically controlled brake prevents removal of shopping carts beyond an area of authorized use such as a parking lot. The brake system is armed by a first magnet which the cart passes as it leaves the store. A second magnet on the cart senses the presence of tracks of magnetically attractive material which are embedded in the pavement along routes of authorized cart use. While on these tracks, this second magnet holds the armed brake system disengaged until the cart rolls beyond such tracks. When the cart re-enters the store, a third magnet disarms the brake system.

Brief summary of the invention

This invention relates to means for preventing theft or removal of shopping carts beyond an authorized area.

Detailed description of the invention

Figure 1:
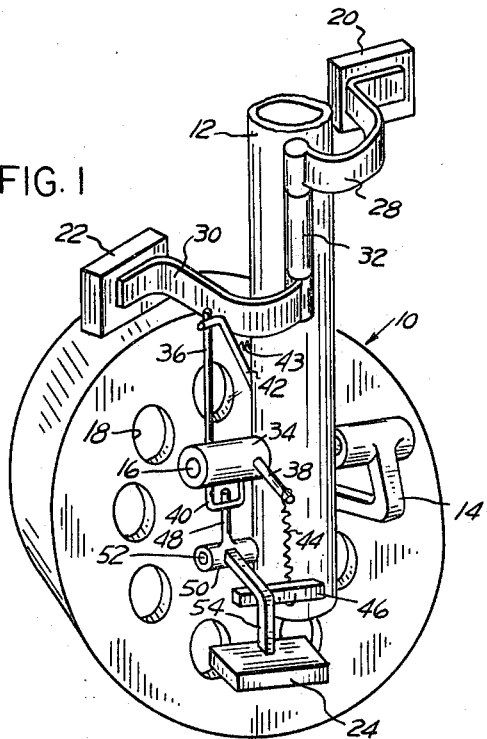
FIG. 1 is a perspective view of a lockable wheel and a portion of the cart frame upon which it is mounted, showing the locked structure of this invention in the disarmed position.

Referring now to the drawings, there is illustrated a wheel 10 which is rotatably mounted on the lower end of a portion of frame 12 of the shopping cart. Wheel 10 would preferably be one of the rear wheels, so as to avoid the more complex arrangement necessary to adapt this system to one of the steerable front wheels. A locking pin 14 is keyed to shaft 16 which is pivotally mounted in frame 12. Locking pin 14 is selectively engageable with one of a series of spaced holes 18 in the inner face of wheel 10, to lock the wheel against rotation under circumstances to be described below.

The position of locking pin is controlled by a series of three magnets: disarming magnet 20, arming magnet 22 and track sensing magnet 24. Disarming and arming magnets 20, 22 are connected to a vertical pivot pin 26 by arms 28 and 30. Pivot pin 26 is rotatably mounted in a sleeve 32 which is fixed to the inside face of cart frame 12.

Also fixed for pivotal movement with locking pin shaft 16 is a sleeve 34, which has projecting from it latch pin 36, spring pin 38 and follower bar 40. Latch pin 36 selectively engages lock-out pin 42 pivotally mounted on the outer side of frame 12. Lock-out pin 42 is capable of pivoting through a vertical plane, and spring 43 biases it upward (or clockwise in FIG. 1) so that it constantly bears against bracket 30. Spring pin 38 serves to anchor the upper end of the locking pin engagement spring 44, the other end being anchored by stop 46 secured to the bottom of cart frame 12.

Follower bar 40 is engaged by cam pin 48 projecting upwardly from sleeve 50 which is pivotally mounted on shaft 52 projecting from cart frame 12. Also connected to sleeve 50 is an L-shaped arm 54 which supports track sensing magnet 24. It will be seen that the weight of magnet 24 normally holds the magnet arm 54 down against stop 46.

Figure 3:
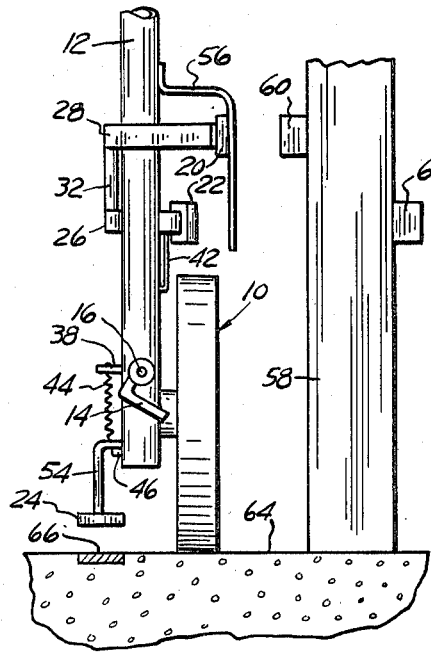
FIG. 3 is a front elevation of the wheel of FIGS. 1 and 2, showing a door jamb and a portion of the associated pavement.

As shown in FIG. 3, a thin non-magnetic stop panel 56 is fastened to the outer side of cart frame 12, and serves to limit outward pivotal movement of disarming and arming magnets 20, 22.

Also in FIG. 3 there is illustrated the lower portion of a door jamb 58. It is contemplated that the jamb separating the entrance and exit doors of the store would be provided with a pair of magnets 60, 62 permanently secured thereto. In the sample shown, upper magnet 60 would be on the entrance side of the jamb and would be at the same height from the ground as disarming magnet 20, while lower magnet 62 would be on the exit side of the door and would be the same height from the ground as arming magnet 22.

In the parking lot pavement 64 leading from the entrance and exit doors of the store there is provided a system of tracks 66 extending over the routes of authorized shopping cart use. These tracks would be made of a ferrous material which would attract and pull downwardly, track sensing magnet 24. Such tracks would not be required inside the store, as will be more fully understood from the following description of the operation of my invention.

Operation

Assume first that the cart is inside the store, and is about to be rolled out into the parking lot. The normal condition of the locking mechanism in that situation is as illustrated in FIG. 1, with disarming magnet 20 being pivoted counterclockwise (as viewed from above in FIG. 1) until it is flush against stop panel 56. In this condition, bracket 30 cams lock-out pin 42 downward toward the left (as viewed in FIG. 1) against the bias of spring 43. In such position, lock-out pin 42 lies in the path of latch pin 36 and prevents the latter from pivoting clockwise (as viewed from the left side of FIG. 1) under the influence of spring 44. Locking pin 14 is thus held out of engagement with holes 18 in wheel 10, since it is keyed to shaft 16 as is latch pin 36 and sleeve 34.

As the shopping cart is wheeled out through the exit door and past lower magnet 62 on door jamb 58, lower magnet 62 attracts arming magnet 22, causing the assembly of the magnets 20, 22 and pin 26 to pivot clockwise (as viewed from above in FIG. 1). Lock-out pin 42, under the action of spring 43 follows this movement of bracket 30 and swings out of engagement with latch pin 36. Though latch pin 36 is now released, locking pin 14 is still not free to pivot into engagement with holes 18 in wheel 10. This is so because the cart is now rolling along the route of tracks 66 once it exits from the store, and such tracks of magnetically permeable material cause track sensing magnet 24 to be pulled downwardly toward the tracks. It will be seen from FIG. 1 that this downward force on magnet 24 biases sleeve 50 and cam pin 48 clockwise (as viewed from the left in FIG. 1), which in turn acts through follower bar 40, sleeve 34 and shaft 16 to hold locking pin 14 out of engagement. In other words, the magnetic attraction force between track sensing magnet 24 and tracks 66 is sufficient to resist the bias of locking springs engagement spring 44.

Assuming that the user of the cart never attempts to take it out of the authorized area of use, the return of the cart through the entrance door of the store brings it past upper magnet 60 on the entrance side of door jamb 58. Upper magnet 60 attracts disarming magnet 20, causing the assembly of magnets 20, 22 and pin 26 to pivot counterclockwise (as viewed from above in FIG. 1), forcing lock-out pin 42 back into the path of latch pin 36, thus positively preventing engagement of locking pin 14 while the cart is in the store, where there are no tracks.

Figure 2:
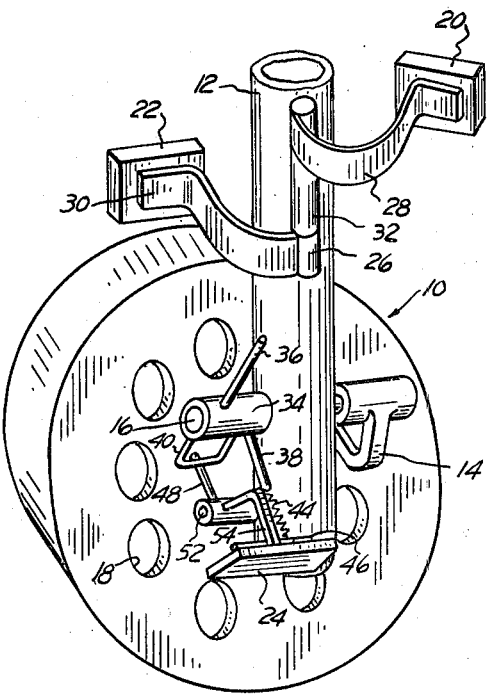
FIG. 2 is a perspective view similar to FIG. 1, but showing the mechanism in the locked position.

Now let it be assumed that the user does attempt to take the cart beyond the authorized area while outside the store. As soon as the cart passes out of range of tracks 66, the downward attraction force on track sensing magnet 24 is eliminated, and locking pin engagement spring 44 causes locking pin 14 to pivot into locking engagement with one of the holes 18 in wheel 10 to lock the wheel against further rotation. This locked condition is illustrated in FIG. 2.

The illustrated mechanism should be normally concealed by a cover or housing, so that it could not be tampered with or rendered inoperative by an unauthorized person. However, once locked, the mechanism could be readily released by a trained employee of the store.

The system could be reversed if desired by using magnetically permeable tracks as a border around the area of authorized use instead of throughout the authorized area. In such a system, track sensing magnet 24 would be positioned so as to cause sleeve 50 and cam pin 48 to pivot counterclockwise (as viewed from the left in FIG. 1) as it was attracted downwardly by crossing the boundary track.

Accordingly, the above specification is to be interpreted as illustrative of only two operative embodiments of this invention, rather than in a strictly limited sense.

I now claim:

1. In a system for preventing unauthorized removal of shopping carts from a predetermined area such as a parking lot adjacent a store, wherein magnetically permeable tracks are embedded in the parking lot pavement along authorized routes of travel from the store door, and wherein it is desired to disable a wheel of the cart from rotation as soon as an attempt is made to push the cart beyond the tracks, the improvement which comprises:

a locking pin pivotally mounted on a portion of the cart frame adjacent a wheel of the cart, said locking pin being adapted to selectively swing into or out of locking engagement with holes in the wheel to respectively prevent or permit wheel rotation;

a pair of sensing magnets connected together in vertically spaced relation for simultaneous pivotal movement, and pivotally mounted upon the cart frame at a point slightly above the lockable wheel, said sensing magnets being, respectively, an arming and a disarming magnet;

a third magnet pivotally mounted on the cart frame adjacent said lockable wheel at a point where said third magnet can sense and move in response to the presence or absence of the tracks, said track sensing magnet being connected to said locking pin so as to hold said locking pin out of its wheel locking position when said track sensing magnet senses the presence of the tracks;

a first spring connected to the cart frame and said locking pin for normally biasing said locking pin into its locking position;

a latch means connected to said locking pin and engageable by said pair of sensing magnets to latch said locking pin out of its locking position when said pair of sensing magnets are in their disarmed position, and to release said locking pin when said pair of sensing magnets are in their armed position;

said spring being strong enough to move said locking pin into its locking position only when said latch means releases said locking pin and said track sensing magnet simultaneously senses and moves upward in response to the absence of a track;

whereby, when the cart rolls past a first externally mounted fixed actuating magnet as the cart leaves the store, said arming magnet is caused to move into the armed position, whereupon said locking pin can move to said locking position if the cart rolls off the track, and the return of the cart into the store brings it past the second externally mounted fixed actuating magnet to cause said disarming magnet to move to the disarmed position, reapplying said latch means to said locking pin.

References Cited

UNITED STATES PATENTS 2,964,140   12/1960   Berezny _____ 188—111
3,434,571   3/1969    Shuler _____ 188—69

GEORGE E. A. HALVOSA, Primary Examiner

U.S. Cl. X.R.

188—110